(12) United States Patent
Kubo et al.

(10) Patent No.: US 6,721,420 B1
(45) Date of Patent: Apr. 13, 2004

(54) FOLDING PORTABLE TELEPHONE APPARATUS

(75) Inventors: Tetsuya Kubo, Kanagawa (JP); Masao Kobayashi, Kanagawa (JP); Hidehiro Yanagibashi, Kanagawa (JP); Teruo Nanmoku, Kanagawa (JP); Suguru Suzuki, Kanagawa (JP); Naokazu Nagasawa, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 397 days.

(21) Appl. No.: 09/704,292

(22) Filed: Nov. 1, 2000

(30) Foreign Application Priority Data

Nov. 5, 1999 (JP) ............................................. 11-316117

(51) Int. Cl.[7] .............................. H04M 1/00; H04B 1/38
(52) U.S. Cl. ................................. 379/433.13; 455/575.7
(58) Field of Search ....................... 379/433.12, 433.13, 379/433.01; 455/90.03, 575.3, 575.4, 575.5, 575.7; 343/702, 805

(56) References Cited

U.S. PATENT DOCUMENTS 6,249,672 B1 * 6/2001 Castiel ................... 379/433.12

FOREIGN PATENT DOCUMENTS

| EP | 0 588 365 A1 | 9/1992 | |
|---|---|---|---|
| EP | 0 661 824 A1 | 12/1993 | |
| EP | 0 661 825 A1 | 7/1995 | |
| EP | 0 703 691 A2 | 3/1996 | |
| GB | 2 280 322 A | 1/1995 | |
| JP | 408129433 A * | 5/1996 | ............ 379/433.13 |

* cited by examiner

Primary Examiner—Jack Chiang
(74) Attorney, Agent, or Firm—Pearne & Gordon LLP

(57) ABSTRACT

The invention supports an antenna (9) retractably from bottom to top via an antenna receiver section (8) on the side of the second case body (2) so that it is possible to fold/unfold the first case body (1) irrespective of the direction of the antenna (9) and whether the antenna (9) is stretched or housed.

3 Claims, 14 Drawing Sheets

FIG.3A
FIG.3B
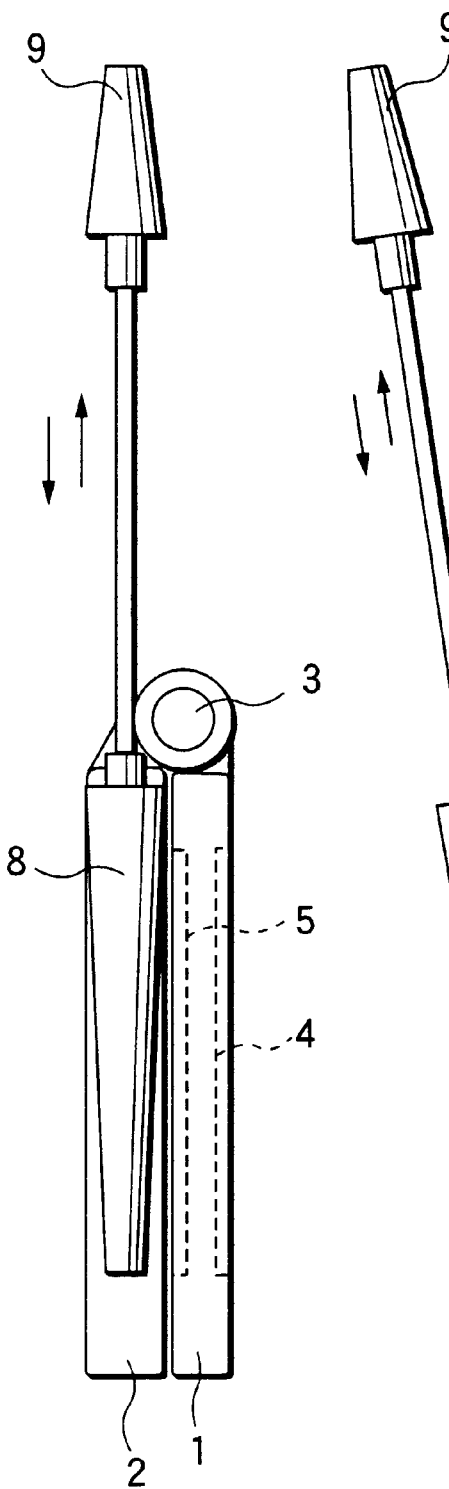
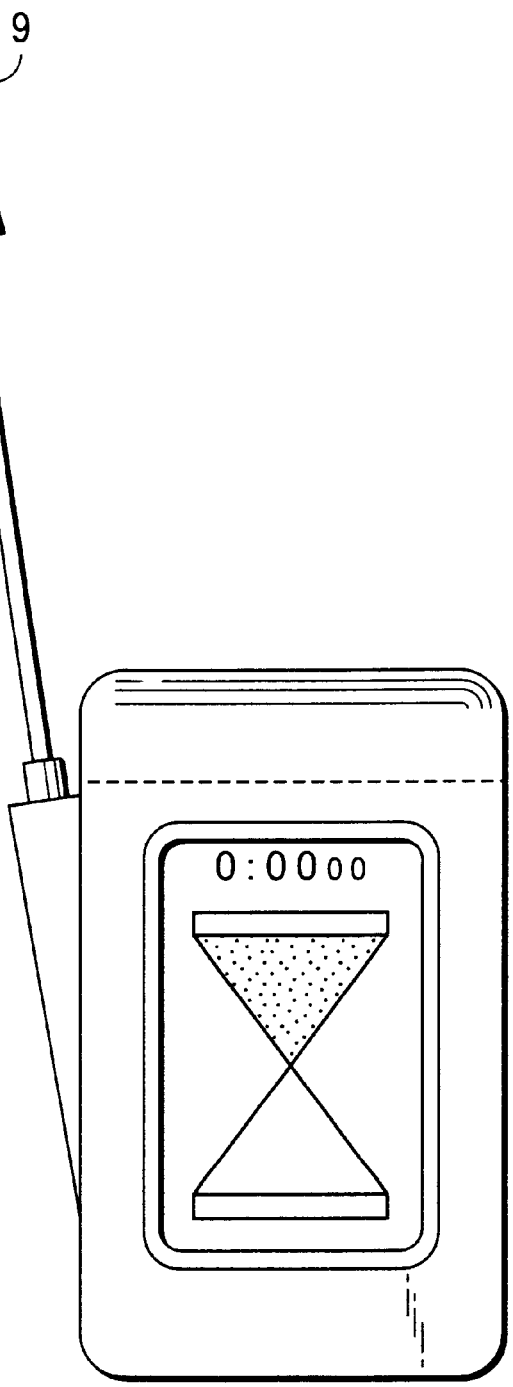

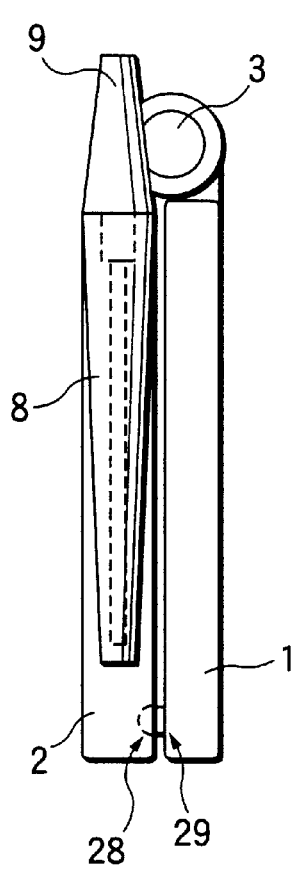
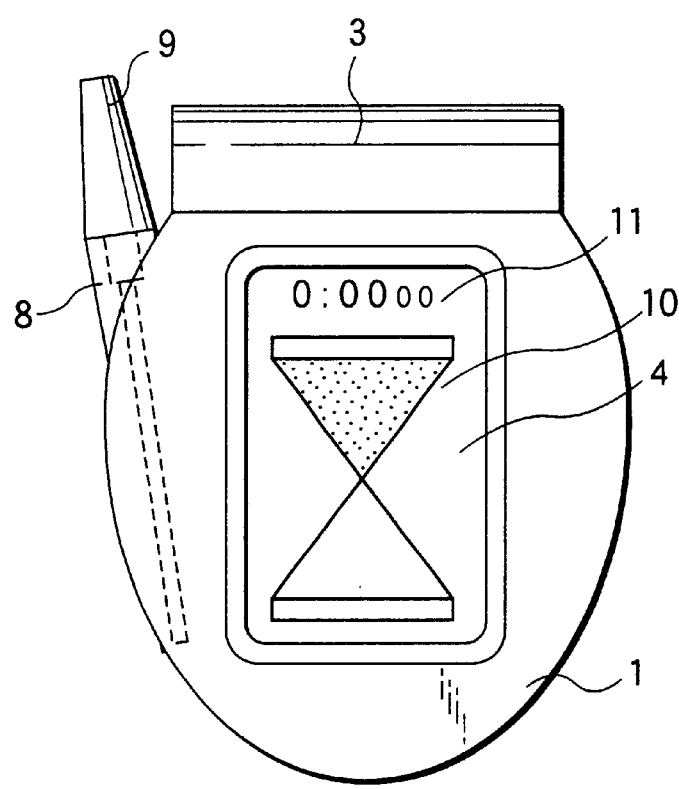

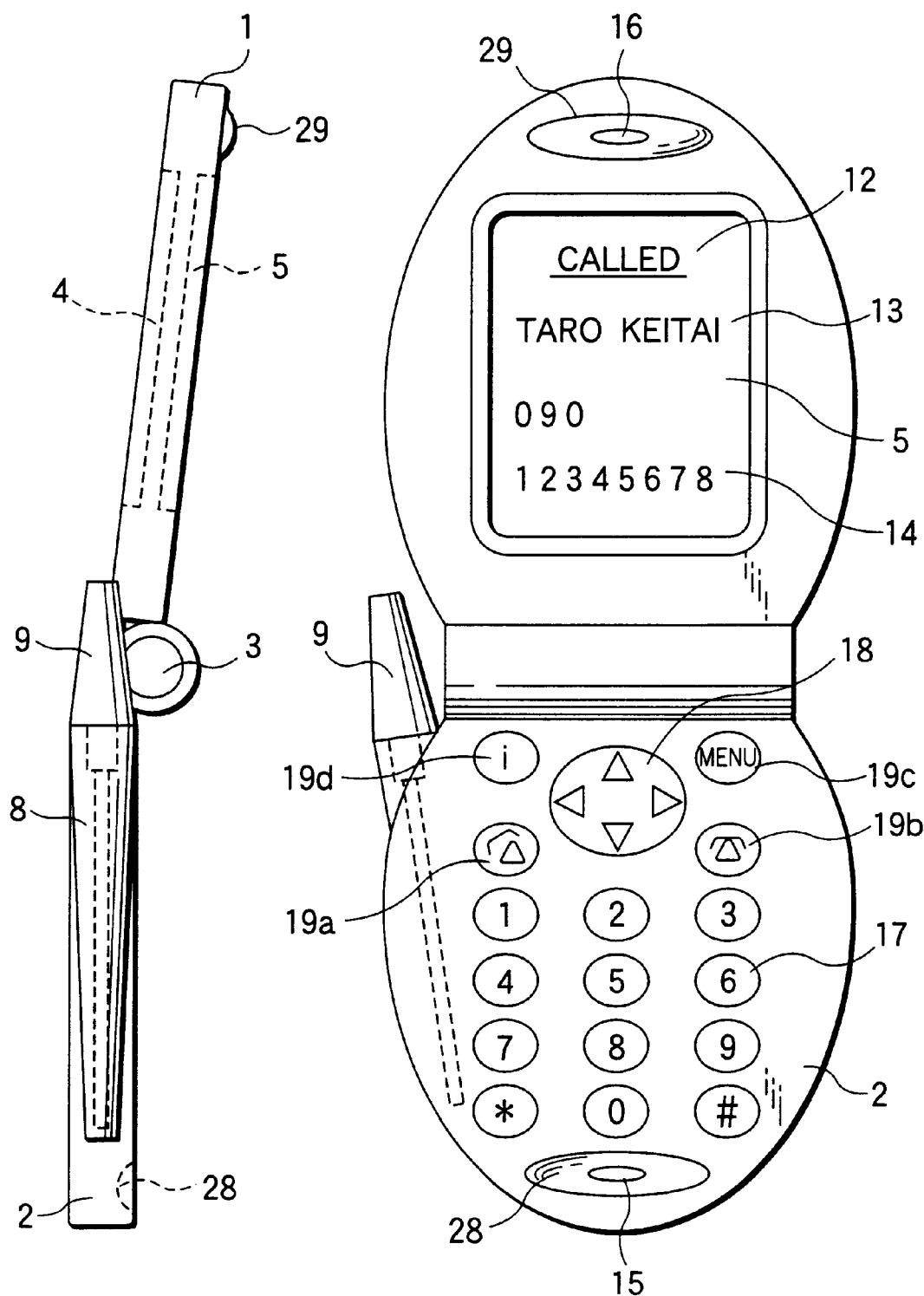

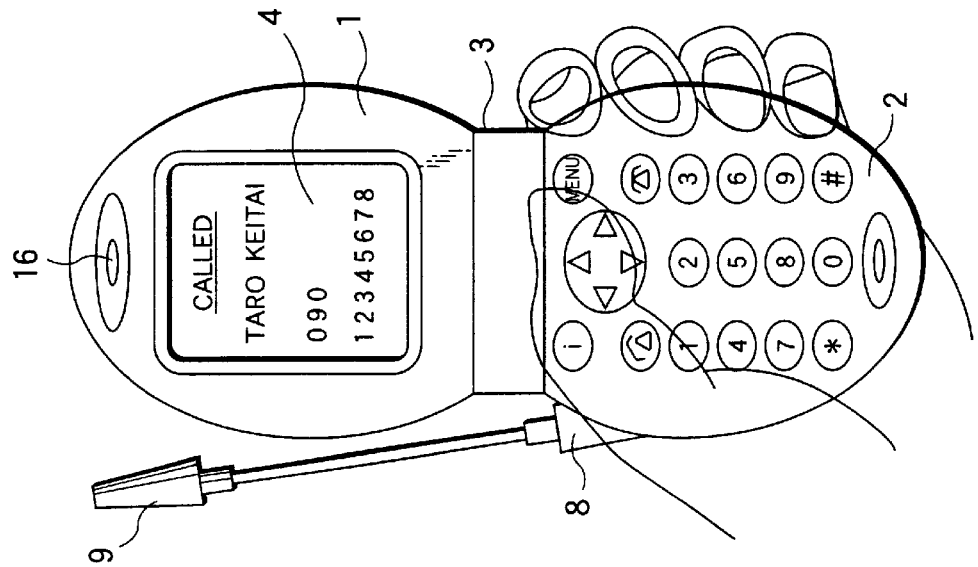
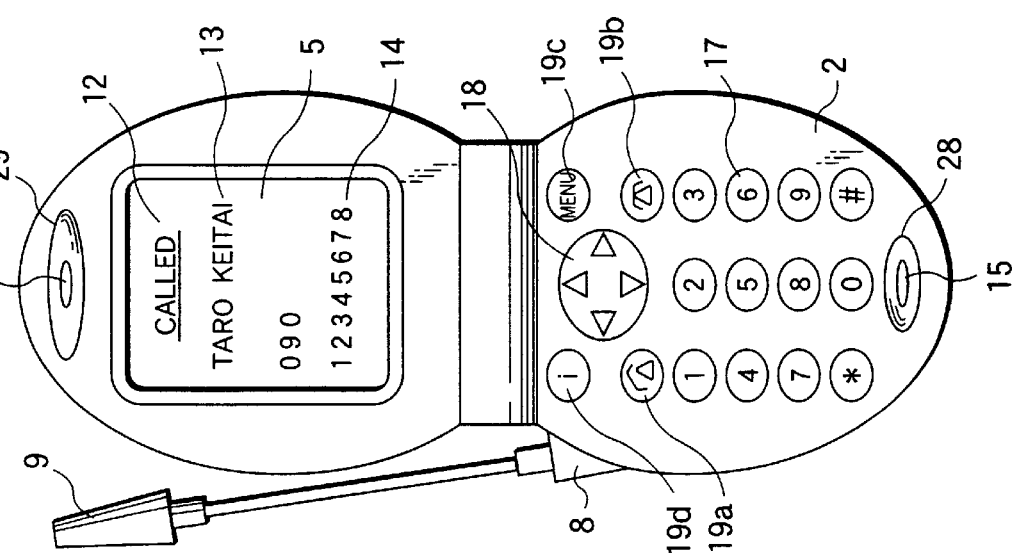
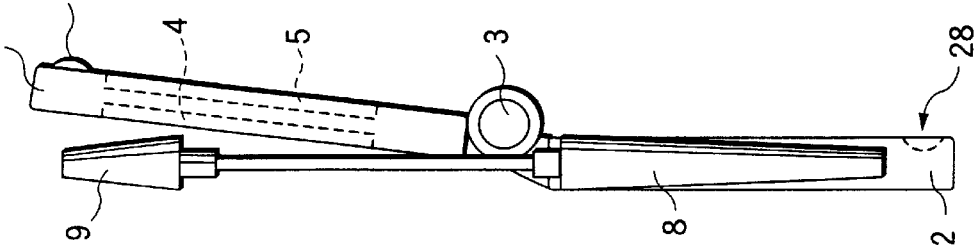

FOLDING PORTABLE TELEPHONE APPARATUS

BACKGROUND OF THE INVENTION

The present invention relates to a folding portable telephone apparatus wherein the first case body and the second case body are configured to be collapsible via hinge.

In portable telephone apparatus, a number of keys are densely arranged on the operation panel where information such as telephone numbers are input. Moreover, a large-screen liquid crystal display is necessary to display electronic mails and characters for non-voice information service. This inevitably upsizes the body of the portable telephone apparatus.

Thus, there emerged folding portable telephone apparatus for example as shown in FIG. 14 which is unfolded when used and folded in two and carried along in compact size when not used. Such apparatus has a problem that an antenna cannot be fully housed in the main body but protrudes out of the outer surface of the main body thus causing the main body rugged and difficult to grasp.

SUMMARY OF THE INVENTION

The present invention aims at providing folding portable telephone apparatus that eliminates the foregoing conventional disadvantage and has a compact size and an easy-to-grasp shape, without providing an antenna receiver section protruding out of the grasp section, even when the main body is folded.

The first aspect of the invention is folding portable telephone apparatus wherein the first case body and the second case body are coupled via hinge in a collapsible fashion, wherein said apparatus is equipped with an antenna retractable slantwise from the side of one main body to another. Via this configuration, it is possible to provide folding portable telephone apparatus whose antenna receiver section fits the user's hand well and that has a compact size and an easy-to-grasp shape.

The second aspect of the invention is folding portable telephone apparatus wherein the first case body and the second case body are coupled via hinge in a collapsible fashion, wherein the length of said hinge is made shorter than the length of said first case body and the second case body in the direction of width in order to form a neck when the main body is unfolded and that said apparatus is equipped with an antenna retractable slantwise from the side of one main body at the neck to another. Via this configuration, it is possible to provide folding portable telephone apparatus that has a compact size and an. easy-to-grasp shape, without providing the antenna receiver section protruding out of the grasp section.

The third aspect of the invention is folding portable telephone apparatus according to the first aspect of the invention, wherein the outward appearance of said first case body and second case body is in an approximate egg shape. Via this configuration, it is possible to provide folding portable telephone apparatus that fits the user's hand well and has a compact size and an easy-to-grasp shape.

BRIEF DESCRIPTION OF THE DRAWINGS

FIG. 3A is a side view of folding portable telephone apparatus according to the first embodiment of the invention with the main body folded and the antenna stretched.

FIG. 3B is a front view of folding portable telephone apparatus according to the first embodiment of the invention with the main body folded and the antenna stretched.

FIG. 8A is a side view of folding portable telephone apparatus according to the second embodiment of the invention with the main body folded.

FIG. 8B is a front view of folding portable telephone apparatus according to the second embodiment of the invention with the main body folded.

FIG. 9A is a side view of folding portable telephone apparatus according to the second embodiment of the invention with the main body unfolded.

FIG. 9B is a front view of folding portable telephone apparatus according to the second embodiment of the invention with the main body unfolded.

FIG. 11A is a side view of folding portable telephone apparatus according to the second embodiment of the invention with the main body unfolded and the antenna stretched.

FIG. 11B is a front view of folding portable telephone apparatus according to the second embodiment of the invention with the main body unfolded and the antenna stretched.

FIG. 11C is a front view of folding portable telephone apparatus according to the second embodiment of the invention with the main body unfolded and the antenna attached while the apparatus is grasped by the user.

DETAILED DESCRIPTION OF THE PREFERRED EMBODIMENTS

Embodiments of the invention will be explained with reference to FIGS. 1 through 13.

Figure 1C:
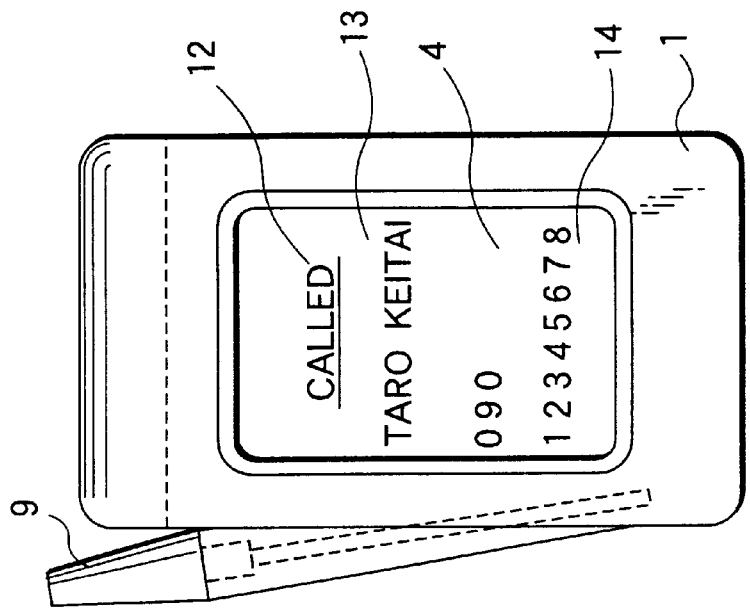
FIG. 1C is a front view of the folding portable telephone apparatus according to the first embodiment of the invention with the main body folded.
Figure 1B:
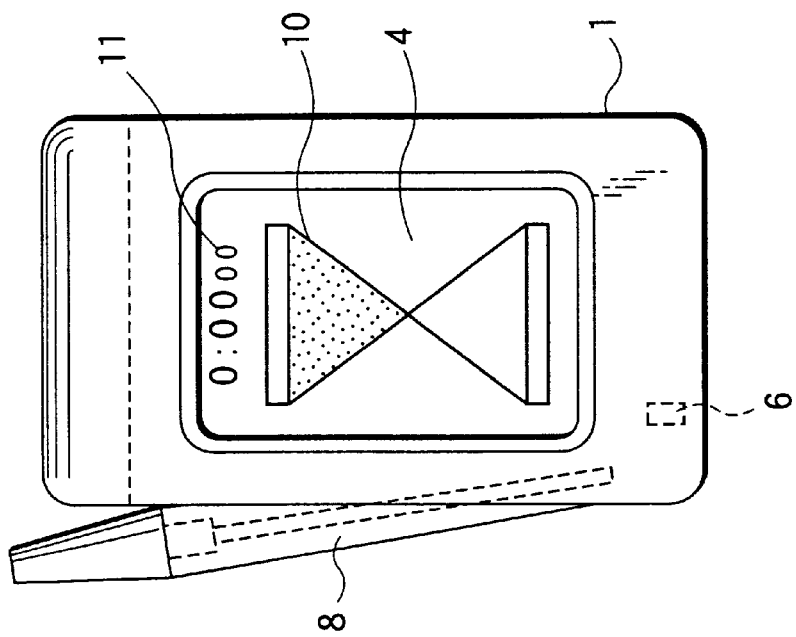
FIG. 1B is a front view of the folding portable telephone apparatus according to the first embodiment of the invention with the main body folded.
Figure 1A:
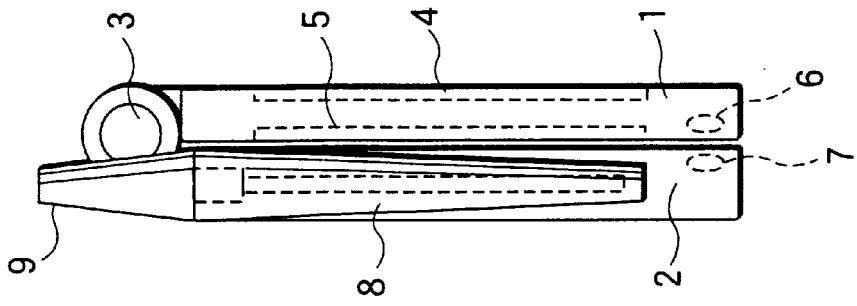
FIG. 1A is a side view of folding portable telephone apparatus according to the first embodiment of the invention with the main body folded.
Figure 2C:
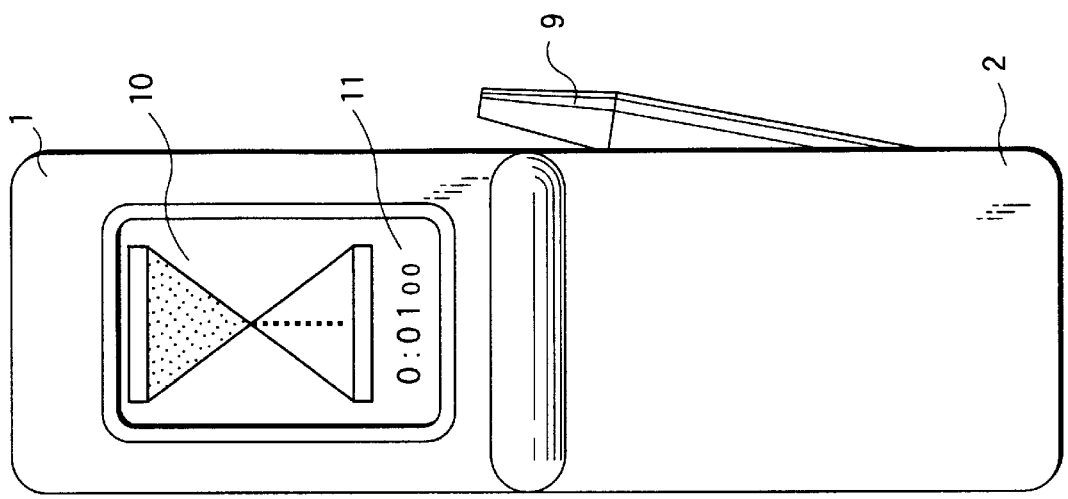
FIG. 2C is a rear view of the folding portable telephone apparatus according to the first embodiment of the invention with the main body unfolded.
Figure 2B:
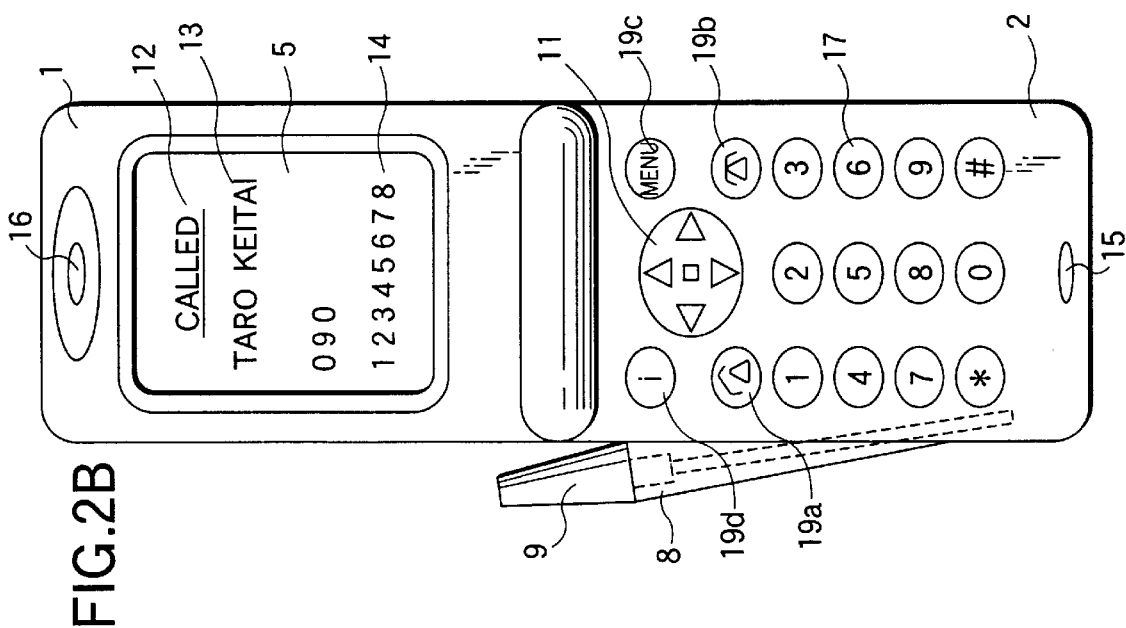
FIG. 2B is a front view of the folding portable telephone apparatus according to the first embodiment of the invention with the main body unfolded.
Figure 2A:
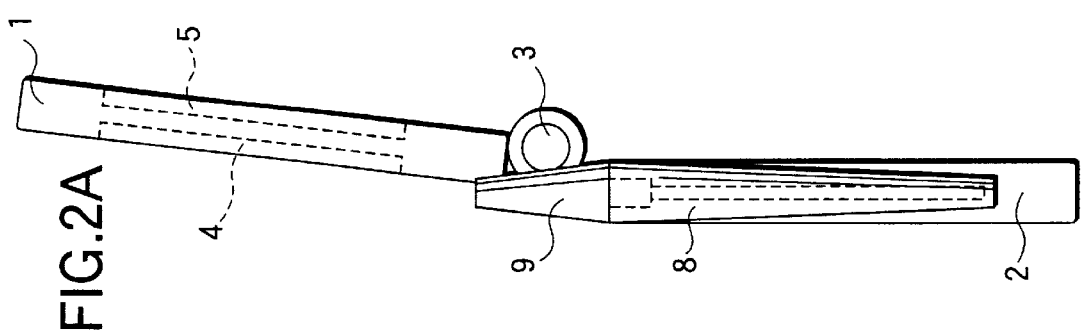
FIG. 2A is a side view of the folding portable telephone apparatus according to the first embodiment of the invention with the main body unfolded.

FIG. 1A is a side view of a folding portable telephone apparatus according to the first embodiment of the invention with the main body folded. FIG. 1B is a front view of the folding portable telephone apparatus according to the first embodiment of the invention with the main body folded. FIG. 1C is a front view of the folding portable telephone apparatus according to the first embodiment of the invention with the main body folded, the apparatus displaying incoming call information when an incoming call has been received. FIG. 2A is a side view of the folding portable telephone apparatus according to the first embodiment of the invention with the main body unfolded. FIG. 2B is a front view of the folding portable telephone apparatus according to the first embodiment of the invention with the main body unfolded, the apparatus displaying incoming call information when an incoming call has been received. FIG. 3C is a rear view of the folding portable telephone apparatus according to the first embodiment of the invention with the main body unfolded, the first display displaying call duration information as a sandglass.

Configuration of the folding portable telephone apparatus will be briefly explained with reference to FIG. 1 and FIG. 2. A first case body 1 and a second case body 2 are coupled via a hinge 3 so that the first case body 1 and the second case body 2 can be folded or unfolded via the hinge 3. As shown in FIG. 1B, first display 4 comprising a liquid crystal display is provided on the outer surface of the first case body 1. On the inner surface of the first case body is provided the second display 5, on the side of which is provided an antenna 9 retractable slantwise. In the first case body 1 is embedded a magnet 6 and in the second case body 2 is embedded a lead switch 7. When the main body is folded to bring the magnet 6 in close proximity to the lead switch 7, the lead switch 7 is turned ON. When the main body is unfolded to place the magnet 6 apart from the lead switch 7, the lead switch 7 is turned OFF. This allows detection of folding/unfolding of the main body. FIG. 1B shows both analog and digital representations of call duration information by displaying a sandglass 10 and cumulative call duration 11 on the first display 4. FIG. 1C shows an indication of receiving and incoming call 12, caller's name and the telephone number of the caller 14 as incoming call information on call incoming, instead of said call duration information.

FIG. 2A shows folding portable telephone apparatus with the first case body 1 unfolded upward. Unfolding the first case body 1 causes controller mentioned later to display text and graphics information on the second display 5 on the inner surface of the first case body. In the meantime, information which is displayed on the first display 4 when the body is folded, is deleted. Instead, a predetermined information, such as call duration information, is displayed.

On the inner surface of the second case body 2 shown in FIG. 2B are provided a key operation area composed of a ten-digit keypad 17, a so-called navigation key 18 for scrolling in four directions and determining target information by pressing the center thereof, a call start key 19a, a call release key 19b, a menu key 19c, a non-voice radio communications service start key 19d for receiving the non-voice radio communications service such as the i mode. A transmitter (microphone) 15 is provided in the lower area of the second case body 2 and a receiver (speaker) 16 is provided on the upper area of the first case body 1.

Figures 4A, 4B:
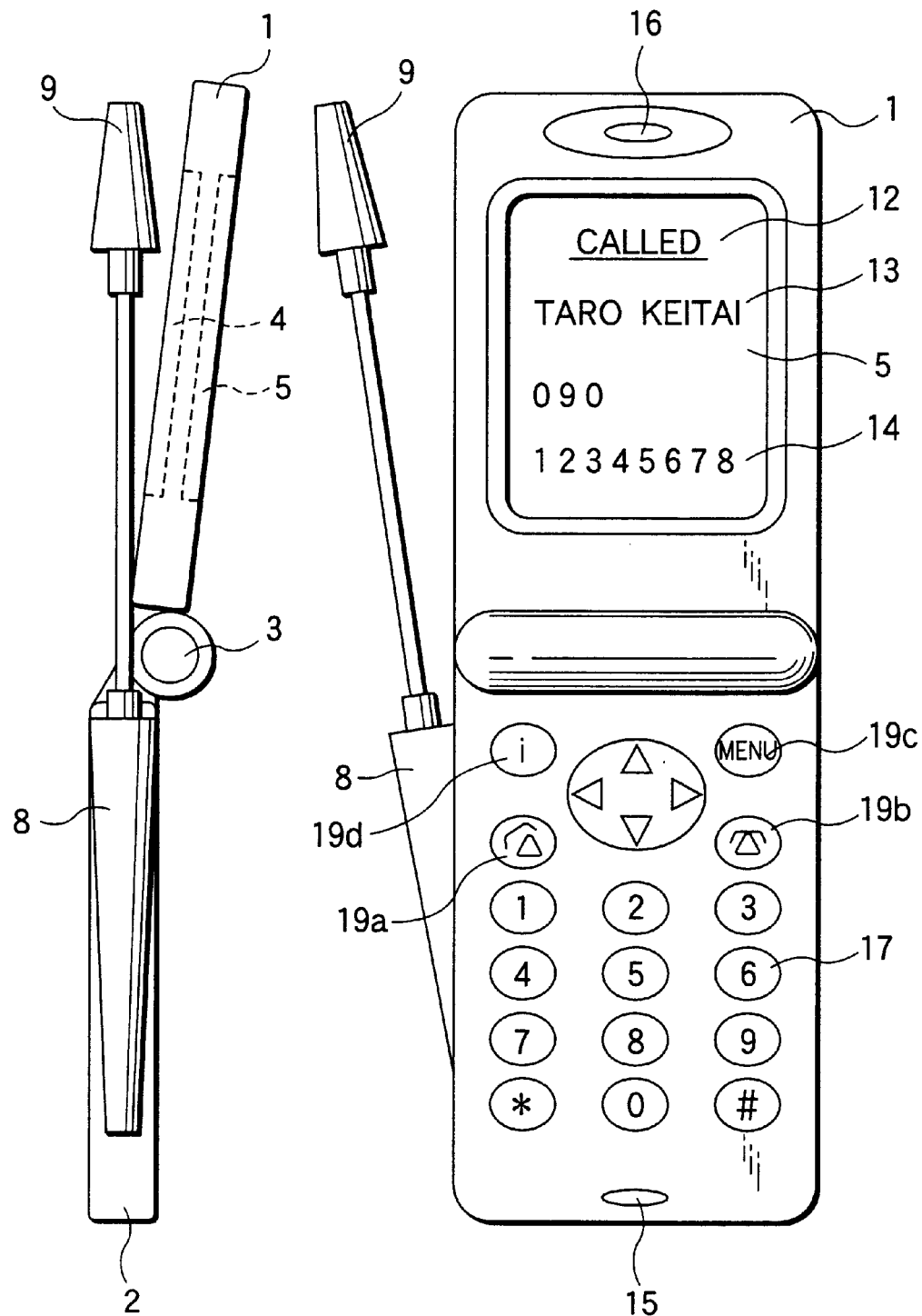
FIG. 4A is a side view of folding portable telephone apparatus according to the first embodiment of the invention with the main body unfolded and the antenna stretched.
FIG. 4B is a front view of folding portable telephone apparatus according to the first embodiment of the invention with the main body unfolded and the antenna stretched.

FIG. 3A and FIG. 4A are side views of the folding portable telephone apparatus according to the first embodiment of the invention with antenna stretched. FIG. 3B and FIG. 4A are front views of the folding portable telephone apparatus according to the first embodiment of the invention with the antenna stretched. The invention supports an antenna 9 retractably from bottom to top via an antenna receiver section 8 on the side of the second case body 2 so that it is possible to fold/unfold the first case body 1 irrespective of the direction of the antenna 9 and whether the antenna 9 is stretched or housed.

Figure 5:
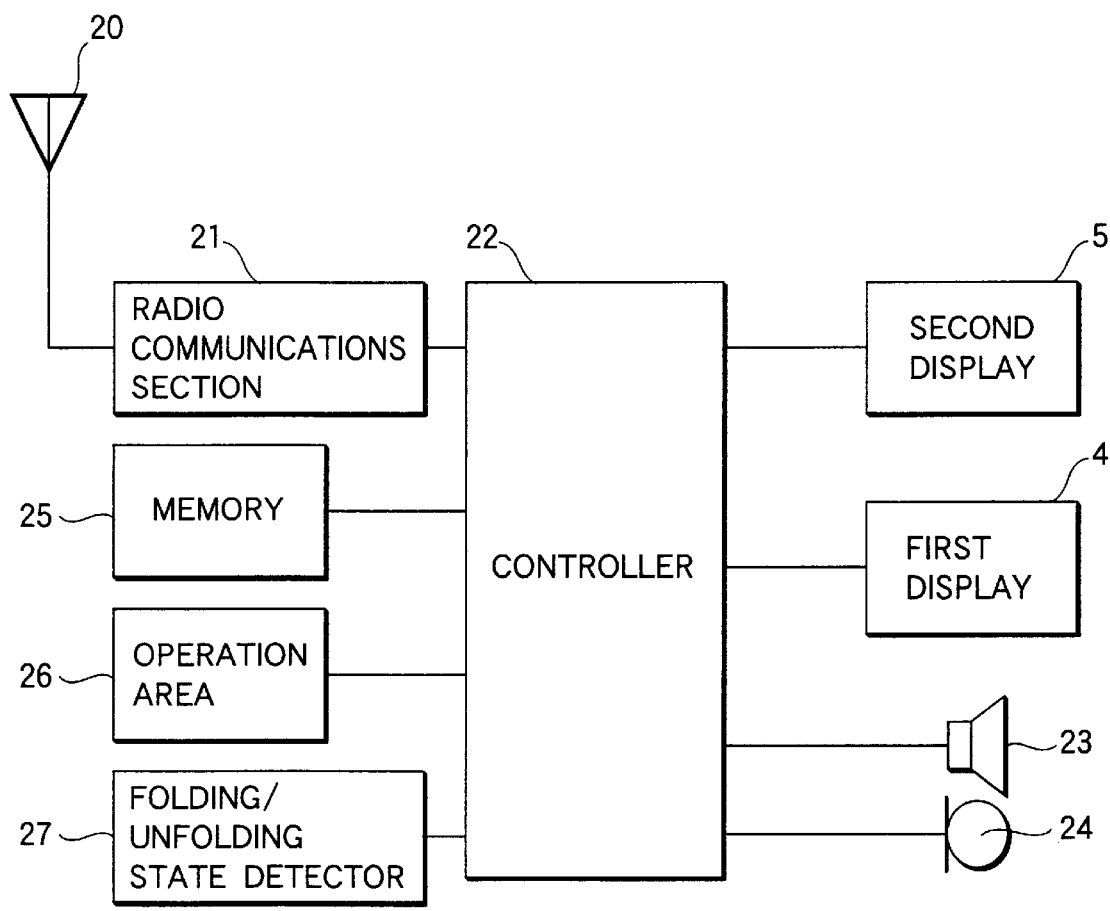
FIG. 5 is a block diagram showing a configuration of folding portable telephone apparatus according to the first embodiment of the invention.
Figure 6:
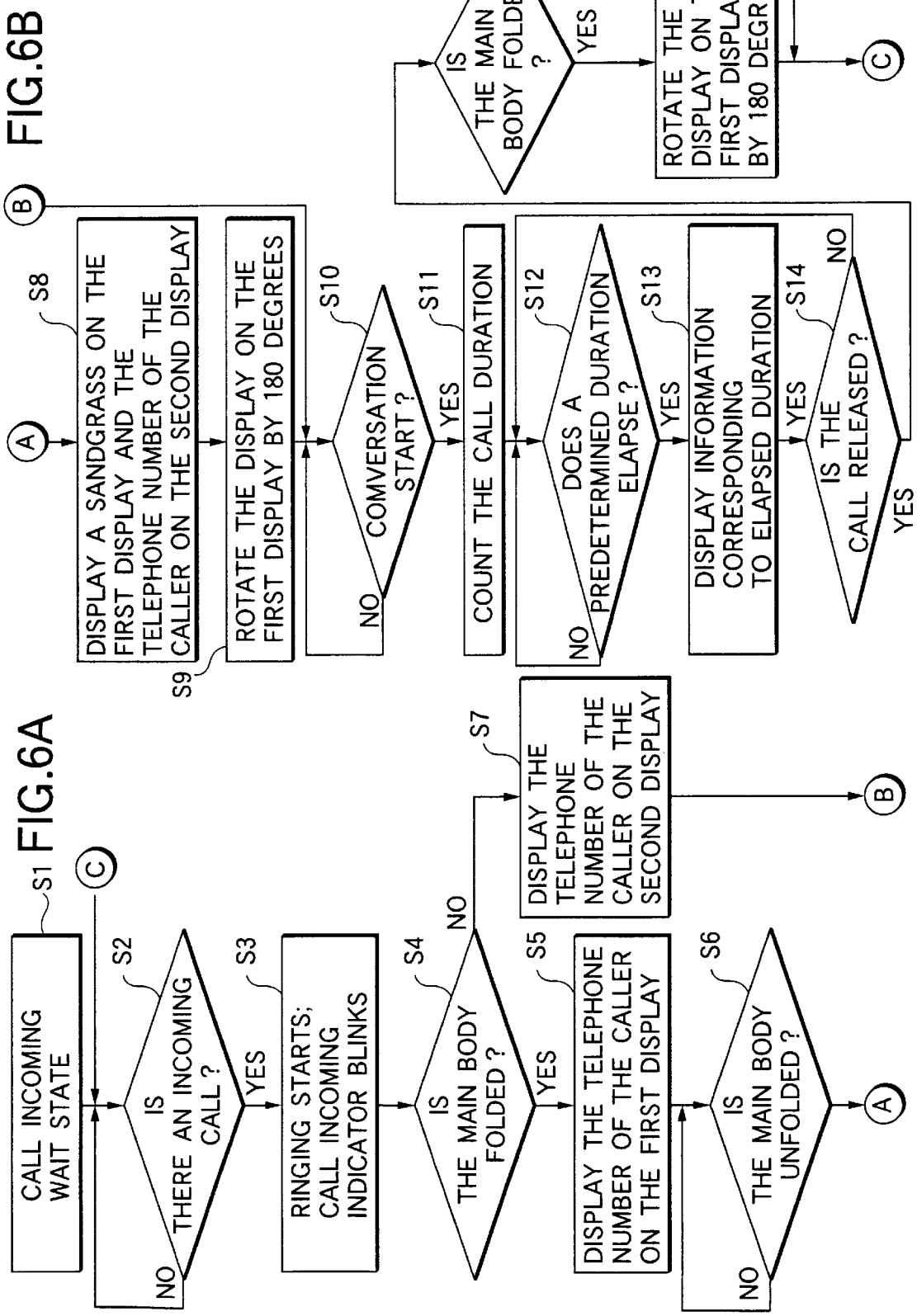
FIG. 6 is a flowchart showing the procedure for displaying incoming call information according to the first aspect of the invention.

FIG. 5 is a block diagram of a simple configuration of folding portable telephone apparatus according to an embodiment of the invention. In FIG. 5, the controller 22 displays call duration information shown in FIG. 1B on the first display 4 in the call incoming wait state. When a call incoming, radio waves coming from an antenna 20 are received by the receiver (not shown) of a radio communications section 21 and received information is transferred to a controller 22. The controller 22 displays the received information such as telephone numbers on the first display 4 on the outer surface of the main body or on the second display 5 on the inner surface of the main body. When the main body is folded, incoming call information is displayed instead of call duration information displayed in the call incoming wait state. When the main body is unfolded, incoming call information is displayed on the second display 5 on the inner surface of the first case body 1.

The controller 22 converts received information to voice information and outputs the voice information from a receiver (speaker) 23. The transmitter (microphone) 24 transfers the user's voice to the controller 22 and transmits the information to the distant party via a transmitter (not shown) of the radio communications section 21 and the antenna 20. A key operation area 26 composed of a ten-digit key and a scroll key is adapted to input signals to the controller 22 via key operation and to store telephone number information, etc. in the memory 25 via the controller 22.

When the user uses the ten-digit keypad 17 (FIG. 2B) to enter a telephone number and press the call start key 19a, the controller 22 transmits the information to a base station via a transmitter (not shown) of the radio communications section 21 and the antenna 20. The user can also enjoy services such as the i mode. In this case, when the non-voice radio communications service information is transmitted from the base station, the information is received via the antenna 20 and the receiver (not shown) of the radio communications section 21 and the controller stores the received information in the memory 25. The cover folding/unfolding state detector 27, on detecting the cover folding/unfolding state, transfers the detected information to the controller 22. The controller 22, based on the above detected results, displays the non-voice information stored in the memory 25 on the first display 4 or second display 5 corresponding to the folding/unfolding state of the main body.

FIG. 6A is a flowchart showing the operation in which folding portable telephone apparatus according to the first embodiment of the invention has an incoming call from the call incoming wait state. With the folding portable telephone apparatus powered on and in the call incoming wait state (step 1), when a call incoming (step 2), ringing starts or a call incoming indicator or a backlight on the first display or the second display blinks (steps 3 and 7).

The controller 22 obtains folding/unfolding state information from the cover folding/unfolding state detector 27 and determines whether the body is folded or unfolded (step 4). When the body is folded, the controller 22 displays caller information, i.e., the telephone number of the caller or caller's name on the first display 4 on the outer surface of the folded main body (step 5). When the user unfolds the main body to answer the call (step 6), the incoming call information displayed on the first display 4 is detleted. Instead, call duration information such as a sandglass 10 is displayed and incoming call information such as the telephoen number of the caller is displayed on the second display (step 8).

Because the first case body rotates about the hinge 3 and comes upside down when the apparats is unfolded, the controller 22 rotates the display on the first display by 180 degrees (step 9). When the call start key 19a is pressed (step 10), the controller counts call duration (step 11). As the call duration elapses (step 12), information corresponding to the elapse of a predetermined duration, for example a figure of sandglass or numerals of cumulative call duration (step 13).

When the call is released (step 14), the controller 22 deletes the incoming call information display and a checks whether the main body is folded or not (step 15). When the main body is folded, the controller 22 rotates the display on the first display 4 by 180 degrees (step 16), and waits for another incoming call. When the main body is unfolded on call incoming, the controller 22 displays incoming call information on the display 5 (step 7). When the main body is unfolded on call released, the controller 22 waits for another incoming call (step 15).

Figure 7:
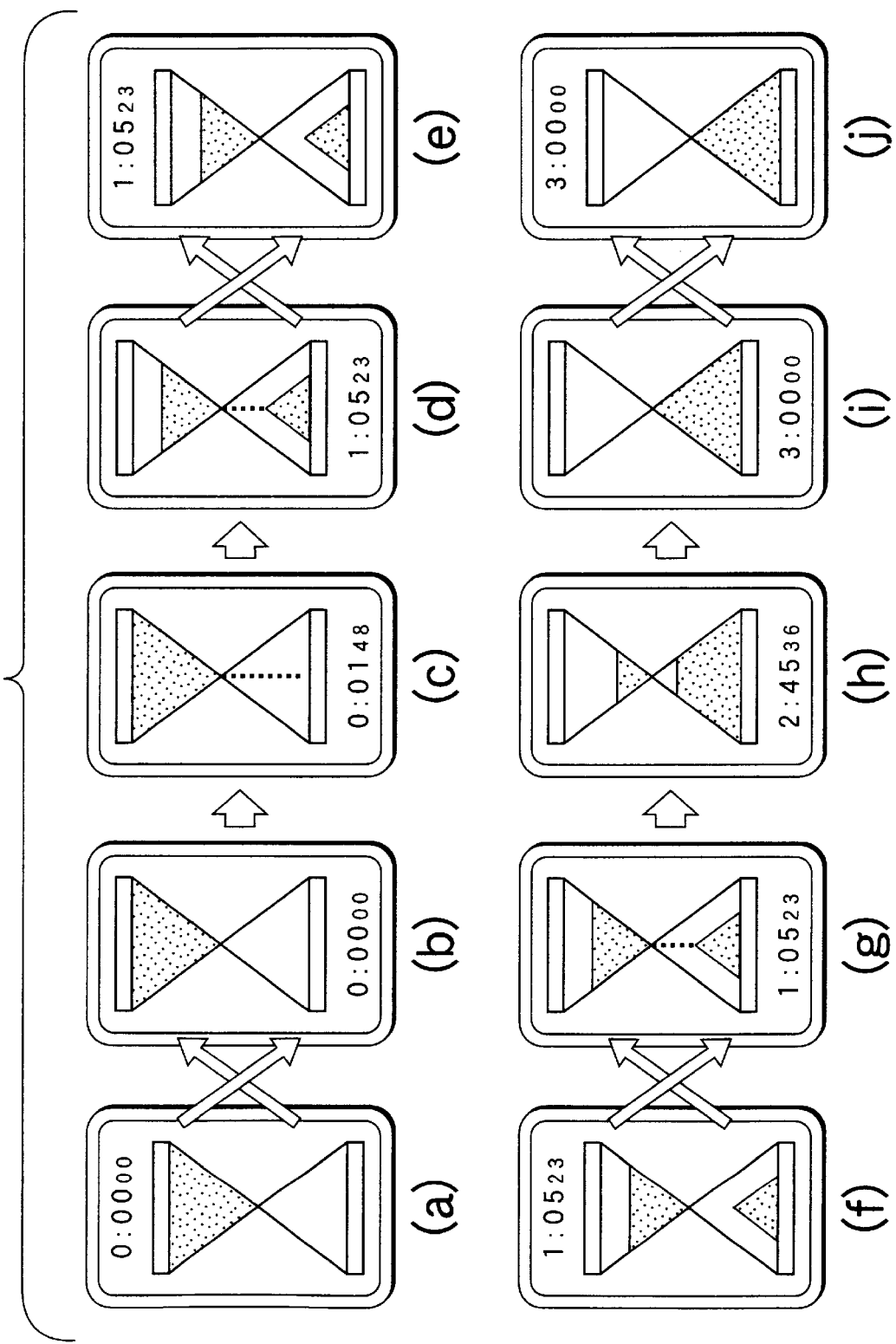
FIG. 7 is an exemplary transition diagram showing the elapse of call duration of the call duration information rat makes transition with time according to the first embodiment of the invention.

FIG. 7 is an exemplary transition diagram showing the elapse of call duration of the call duration information displayed on the first display of pre-paid portable telephone apparatus having three hours of call duration. FIG. 7(a) shows a state in which the first body in folded, with cumulative call duration 11 being "0:00 00" the apparatus just purchased and the sandglass 10 full of sand in the upper section. When a call incoming and the first case body is unfolded upward, the first case body itself comes upside down about the hinge 3, however, a display rotated by 180 degrees as shown in FIG. (b) of FIG. 7 so that a normal representation of the information regarding top and bottom can be seen. As the call duration elapses, the sand gradually moves from the upper section to lower section, as shown in FIGS. 7(c) and (d). When the call is released and the first case body is unfolded, the first case body comes upside down again although the display is rotated by 180 degrees as shown in FIG. 7(e) in order to provide a normal representation of the information. On another call incoming, display changes as shown in FIGS. 7(f), (g), (h), (i), and (j), same as the foregoing operation.

FIG. 8 shows a second embodiment of the invention in which the outward appearance of the first case body 1 and the second case body 2 is in an approximate egg shape and supported in collapsible fashion via the hinge shorter than the length of the main body in the direction of width. The antenna 9 is retractably supported slantwise from bottom to top via an antenna receiver section 8 on the side of the second case body 2.

Figure 10A:
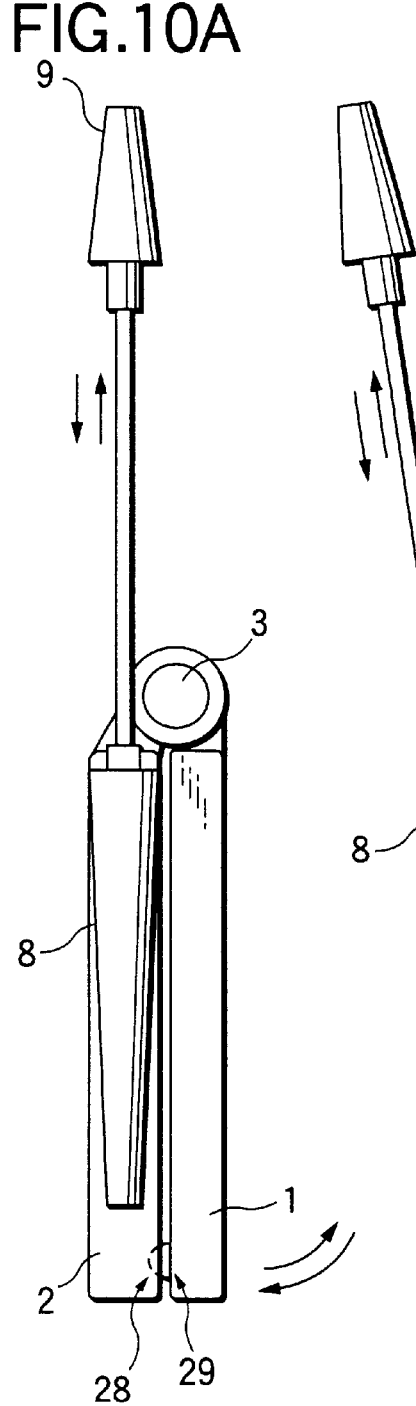
FIG. 10A is a side view of folding portable telephone apparatus according to the second embodiment of the invention with the main body folded and the antenna stretched.
Figure 10B:
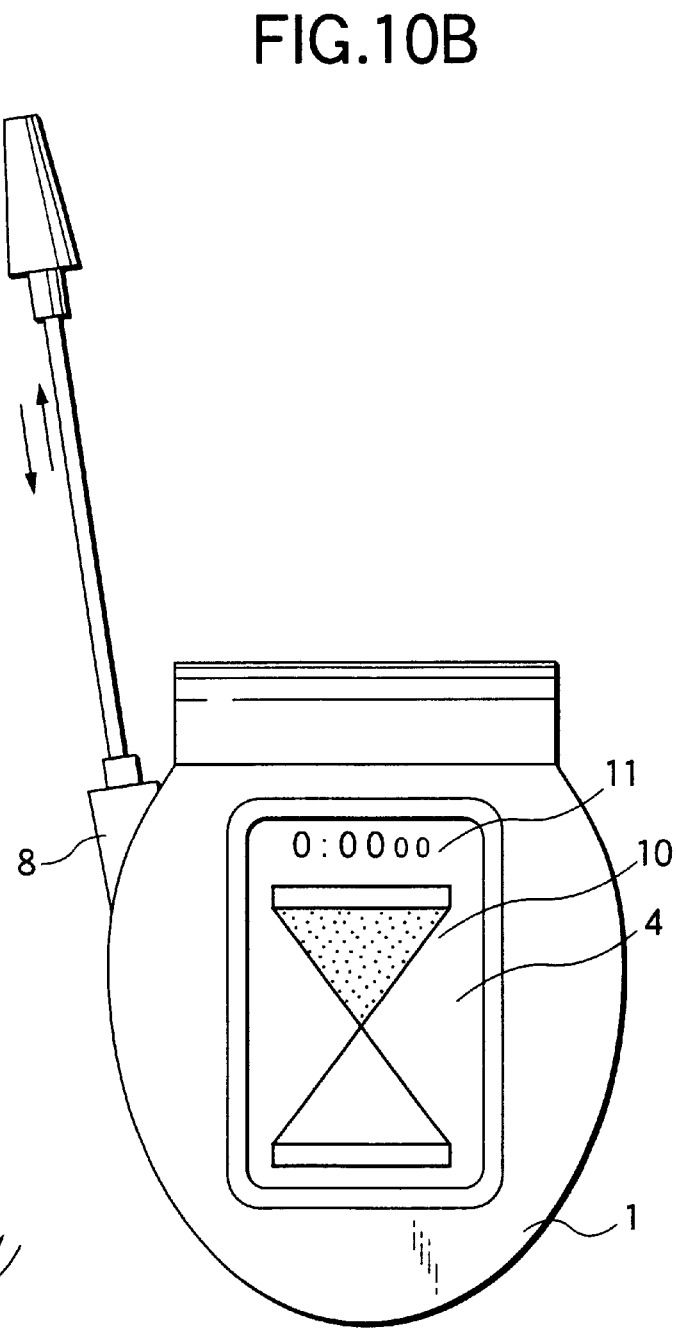
FIG. 10B is a front view of folding portable telephone apparatus according to the second embodiment of the invention with the main body folded and the antenna stretched.

FIG. 9 shows folding portable telephone apparatus with the main body unfolded. Two egg-shaped main bodies are coupled via a short hinge 3 and the antenna 9 is arranged at the neck of the two egg-shaped main bodies. FIGS. 10 and 11 show the folding portable telephone apparatus with the antenna stretched. In particular, as shown in FIG. 11, the antenna 9 is stretched slantwise and upward out of the second case body, along the external shape of the first case body 1, from the neck of the main body. FIG. 11C shows an external view of folding portable telephone apparatus while it is grasped. The apparatus fits the user's hand well and easy to grasp.

As understood from the side views of FIG. 9A and FIG. 11A, in close proximity to the transmitter 15 is formed a concave section 28 and in close proximity to the receiver 16 is formed a convex section 29. With the main body folded, the concave section 28 and the convex section 29 engage each other as shown in FIG. 8A and FIG. 10A. Although not shown, urging mechanism such as a plate spring and a torsion coil spring is provided at the hinge 3 to give a pressing force when the main body is folded. The urging mechanism may be magnets embedded in the tips of the main body in order to attract each other when the main body is folded. The concave section in close proximity to the transmitter 15 has an advantage of collecting the user's voice. The convex section in close proximity to the received 16 has an advantage of transmitting sound securely, like an earphone in the ear.

Figure 12A:
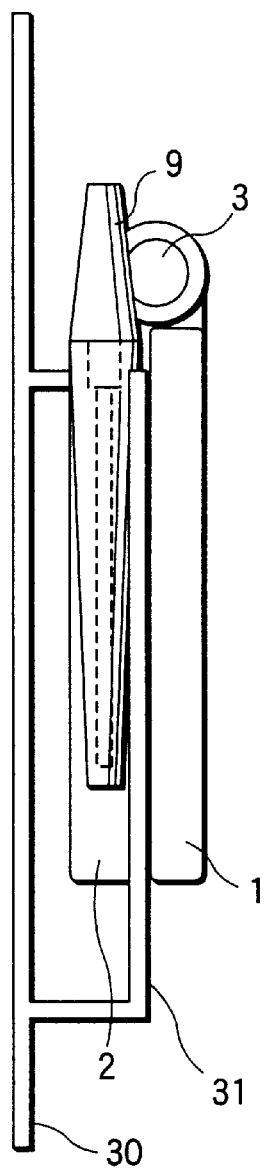
FIG. 12A is a side view of folding portable telephone apparatus according to the second embodiment of the invention with the main body with the main body housed in a pocket of clothes.
Figure 12B:
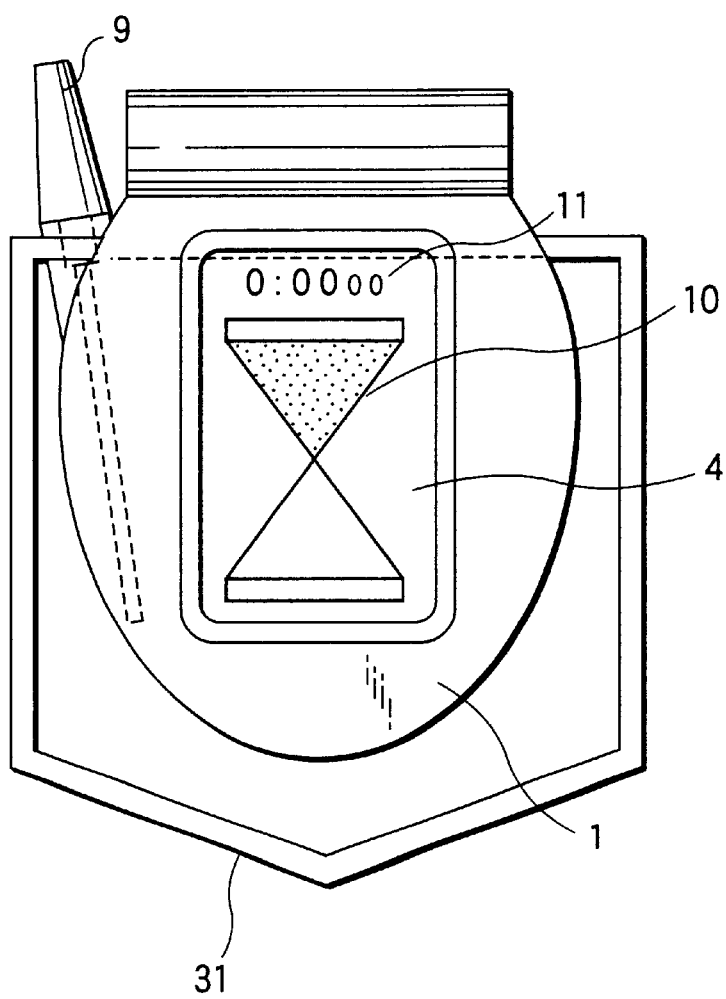
FIG. 12B is a front view of folding portable telephone apparatus according to the second embodiment of the invention with the main body with the main body housed in a pocket of clothes.
Figure 13A:
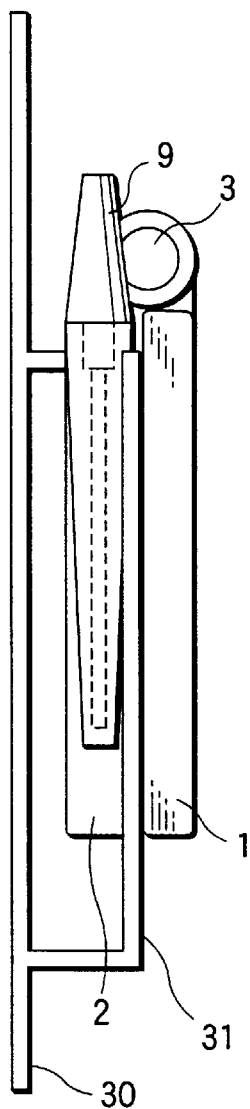
FIG. 13A is a side view of folding portable telephone apparatus according to the second embodiment of the invention with the main body with the main body housed in a pocket of clothes.
Figure 13B:
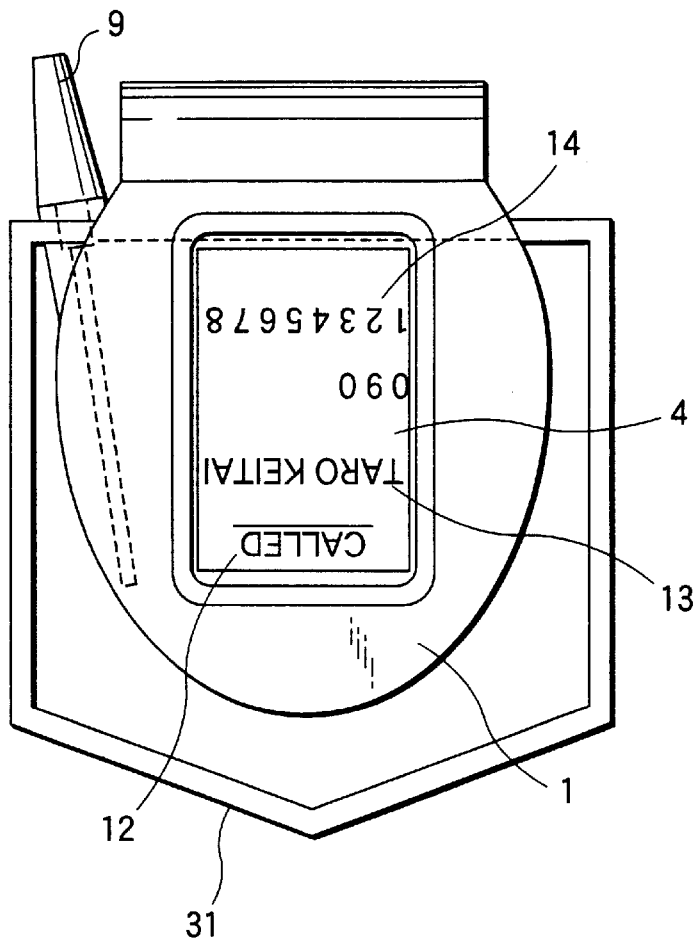
FIG. 13B is a front view of folding portable telephone apparatus according to the second embodiment of the invention with the main body with the main body housed in a pocket of clothes.
Figure 14A:
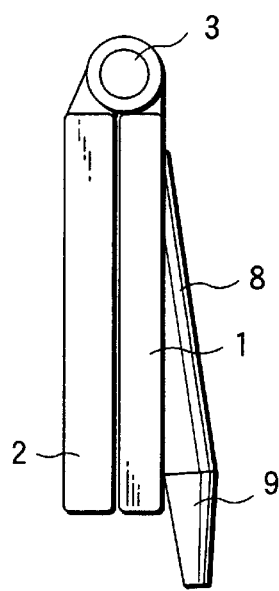
FIG. 14A is a side view of conventional folding portable telephone apparatus with the main body folded.
Figure 14B:
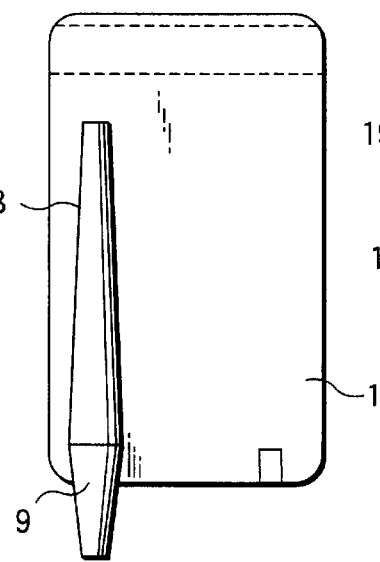
FIG. 14B is a front view of conventional folding portable telephone apparatus with the main body folded.
Figure 14C:
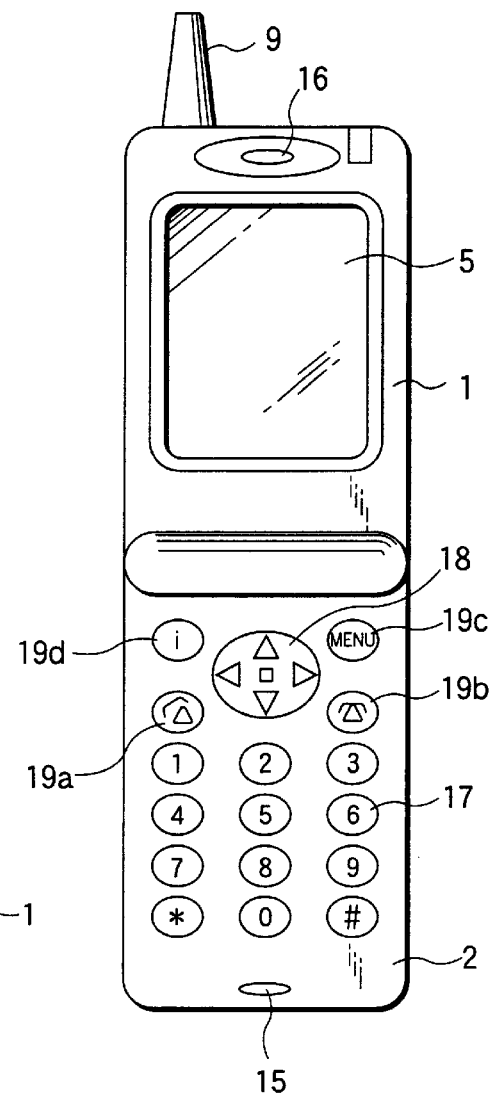
FIG. 14C is a front view of conventional folding portable telephone apparatus with the main body unfolded.

FIGS. 12 to 14 show the folding portable telephone apparatus according to the second embodiment of the invention housed in a pocket 31 of clothes 30. As shown in FIG. 12A, the apparatus is housed with the first case body 1 out of the pocket 31 and the second case body 2 in the pocket 31, and the first case body 1 and the second case body 2 pinching the pocket 31. When the main body is folded, the concave section 28 and the convex section 29 engages each other so that the concave section 28 and the convex section 29 work as an alligator clip onto the tissue of the pocket 31. While conventional folding portable telephone apparatus is compact and may be dropped inadvertently, the concave section 28 and the convex section 29 plays the role of an anti-drop mechanism to the relief of the user.

FIG. 13 shows incoming call display provided on receiving a incoming call with folding portable telephone apparatus housed in the pocket 31. Unlike FIG. 1, incoming call information is normally displayed to the user with the apparatus housed in the pocket 31.

As mentioned earlier, the first aspect of the invention is folding portable telephone apparatus wherein the first case body and the second case body are coupled via hinge in a collapsible fashion, wherein said apparatus is equipped with an antenna retractable slantwise from the side of one main body to another. This configuration has an advantage that it is possible to provide folding portable telephone apparatus whose antenna receiver section fits the user's hand well and that has a compact size and an easy-to-grasp shape.

The second aspect of the invention is folding portable telephone apparatus wherein the first case body and the second case body are coupled via hinge in a collapsible fashion, in the length of said hinge is made shorter than the length of said first case body and the second case body in the direction of width in order to form a neck when the main body is unfolded and that said apparatus is equipped with an antenna retractable slantwise from the side of one main body at the neck to another. This configuration has an advantage that it is possible to provide folding portable telephone apparatus that has a compact size and an easy-to-grasp shape, without providing the antenna receiver section protruding out of the grasp section.

The third aspect of the invention is folding portable telephone apparatus according to the first aspect of the invention, wherein the outward appearance of said first case body and second case body is in an approximate egg shape. This configuration has an advantage that it is possible to provide folding portable telephone apparatus that fits the user's hand well and has a compact size and an easy-to-grasp shape.

What is claimed is:

1. A folding portable telephone apparatus comprising:

a first case body;

a second case body;

a hinge by which the first case body and the second case body are coupled so that the apparatus can be folded and unfolded; and an antenna retractably and slantwise provided in the side of one of the first case body and the second case body in the direction of another case body with respect to the apparatus unfolded.

2. A folding portable telephone apparatus according to claim 1, wherein a length of the hinge is made shorter than the length of said first case body and the second case body in the direction of width in order to form a neck portion when the main body is unfolded, wherein the antenna is provided in the neck portion.

3. A folding portable telephone apparatus according to claim 1, wherein the first case body and second case body have approximate egg shapes.

* * * * *